United States Patent
Bai et al.

(10) Patent No.: US 11,565,255 B2
(45) Date of Patent: Jan. 31, 2023

(54) VALVE SYSTEM FOR DRIVING FLUID AND METHOD FOR USING THE SAME

(71) Applicants: Capitalbio Corporation, Beijing (CN); West China Hospital of Sichuan University, Sichuan (CN)

(72) Inventors: Liang Bai, Beijing (CN); Tengfei Guo, Beijing (CN); Lei Wang, Beijing (CN); Xinying Zhou, Beijing (CN); Juan Xin, Beijing (CN); Baolian Li, Beijing (CN); Li Ma, Beijing (CN); Libing Dong, Beijing (CN); Jing Cheng, Beijing (CN)

(73) Assignees: Capitalbio Corporation, Beijing (CN); West China Hospital of Sichuan University, Chengdu (CN)

( * ) Notice: Subject to any disclaimer, the term of this patent is extended or adjusted under 35 U.S.C. 154(b) by 115 days.

(21) Appl. No.: 17/168,763

(22) Filed: Feb. 5, 2021

(65) Prior Publication Data

US 2021/0322983 A1    Oct. 21, 2021

(30) Foreign Application Priority Data

Apr. 18, 2020    (CN) .......................... 202010308400.4

(51) Int. Cl.
*B01L 3/00*    (2006.01)
*F16K 31/12*    (2006.01)
*F16K 99/00*    (2006.01)

(52) U.S. Cl.
CPC ........ *B01L 3/502738* (2013.01); *F16K 31/12* (2013.01); *B01L 2200/0621* (2013.01);
(Continued)

(58) Field of Classification Search
CPC ....... B01L 3/502738; B01L 2200/0621; B01L 2300/08; B01L 2300/0809;
(Continued)

(56) References Cited

U.S. PATENT DOCUMENTS

| 8,470,588 B2 | 6/2013 | Boehm et al. |
| 2001/0001060 A1* | 5/2001 | Kellogg ............ B01L 3/502738 435/7.1 |

(Continued)

FOREIGN PATENT DOCUMENTS

| CN | 105886386 A | 8/2016 |
| CN | 106268994 A | 1/2017 |

(Continued)

OTHER PUBLICATIONS

Hawach Scientific "Inert Support and Matters Needing Attention of Chromatography Filter Paper". https://www.hawachfilterpaper.com/inert-support-and-matters-needing-attention-of-chromatography-filter-paper/ (Year: 2020).*

(Continued)

*Primary Examiner* — Jennifer Wecker
*Assistant Examiner* — Oyeleye Alexander Alabi
(74) *Attorney, Agent, or Firm* — Knobbe, Martens, Olson & Bear, LLP

(57) ABSTRACT

A valve system for driving fluid and a method for using the same are provided. The valve system includes a fluid unit far away from the rotation center, a fluid unit close to the rotation center, a fluid transferring unit and a gas path pipeline for communicating the fluid unit close to the rotation center with the fluid unit far away from the rotation center. A rotation radius of a fluid outlet of the fluid unit far away from the rotation center is greater than that of a fluid inlet of the fluid unit close to the rotation center. The fluid outlet of the fluid unit far away from the rotation center is (Continued)

located at an end thereof away from the rotation center, and the fluid inlet of the fluid unit close to the rotation center is located at an end thereof close to the rotation center.

17 Claims, 7 Drawing Sheets

(52) U.S. Cl.
CPC ... *B01L 2300/08* (2013.01); *B01L 2300/0809* (2013.01); *B01L 2300/0819* (2013.01); *B01L 2400/06* (2013.01); *F16K 99/0055* (2013.01)

(58) Field of Classification Search
CPC ......... B01L 2300/0819; B01L 2400/06; B01L 2300/0803; B01L 2400/0406; B01L 2400/0409; B01L 3/50273; B01L 3/5027; F16K 31/12; F16K 99/0055; C12M 1/00; C12M 1/34; C12M 1/38
See application file for complete search history.

(56) References Cited

U.S. PATENT DOCUMENTS

| | | | |
|---|---|---|---|
| 2009/0169430 | A1 | 7/2009 | Yamamoto et al. |
| 2015/0273465 | A1* | 10/2015 | Kijima ............... A61B 5/14532 422/68.1 |
| 2019/0143324 | A1 | 5/2019 | Wang et al. |

FOREIGN PATENT DOCUMENTS

| | | |
|---|---|---|
| CN | 107398307 A | 11/2017 |
| CN | 110777049 A | 2/2020 |
| EP | 2 138 232 A1 | 12/2009 |
| WO | WO 98/53311 A2 | 11/1998 |
| WO | WO 2011/011350 A2 | 1/2011 |

OTHER PUBLICATIONS

Extended European Search Report in European Patent Application No. 21151493.0 dated Jul. 8, 2021.

* cited by examiner

VALVE SYSTEM FOR DRIVING FLUID AND METHOD FOR USING THE SAME

The present disclosure claims the priority to Chinese Patent Application No. 202010308400.4 titled "VALVE SYSTEM FOR DRIVING FLUID AND METHOD FOR USING THE SAME", filed with the China National Intellectual Property Administration on Apr. 18, 2020, which is incorporated herein by reference in its entirety.

FIELD

The present application relates to the technical field of medical instruments, and in particular to a valve system for driving fluid. The present application further relates to a method for using the valve system for driving the fluid.

BACKGROUND

In a centrifugal microfluidic system, a driving force of liquid is mainly centrifugal force along the radius direction from an end far away from a rotation center towards the outside. According to actual needs, the flow of the liquid may be controlled in time sequence by combining with functional structures such as a siphon valve and the like. The centrifugal force generated when a chip rotates is used to drive the liquid, which reduces the complexity of a liquid control system and is a microfluidic driving method usually used in a simple microfluidic system. The driving force on the liquid has only an approximate direction, that is, along a radius direction from an end close to the rotation center to the end far away from the rotation center.

As shown in FIG. 1, in a biochemical reaction chip, an upstream fluid unit 02, a fluid unit far away from the rotation center 03 and a downstream fluid unit 04 are sequentially communicated from a central position 01 towards the outside in the radial direction. A gas path passage 05 communicates the upstream fluid unit with the downstream fluid unit, so that the liquid flows outward along the radius direction.

However, for a complicated microfluidic system, especially for a highly integrated biological testing microfluidic chip, multiple kinds of liquid need to be controlled and multiple reaction processes need to be realized. With the increase of operation steps and reaction processes, a prominent problem is that a radius of the chip continuously increases, and the more liquid processing steps or reaction processes, the larger the radius required. When the radius of the microfluidic chip increases, it not only brings a lot of difficulties to the chip manufacturing and supporting instrument system, but also brings great limitations to its application. Meanwhile, during the process of the fluid transfer, external force is needed for the fluid transfer, which causes the tedious operation of fluid transfer steps in the microfluidic chip.

Therefore, those skilled in the art have a strong desire that is how to facilitate the fluid transfer in the microfluidic chip.

SUMMARY

An object of the present application is to provide a valve system for driving fluid, so as to facilitate the fluid transfer in a microfluidic chip. And another object of the present application is to provide a method for using the valve system for driving the fluid.

In order to achieve the above objects, a valve system for driving fluid is provided according to the present application, which is applied to a microfluidic chip and includes a fluid unit far away from a rotation center, a fluid unit close to the rotation center, a fluid transferring unit and a gas path pipeline for communicating the fluid unit close to the rotation center with the fluid unit far away from the rotation center. A rotation radius of a fluid outlet of the fluid unit far away from the rotation center is greater than a rotation radius of a fluid inlet of the fluid unit close to the rotation center. The fluid outlet of the fluid unit far away from the rotation center is located at an end, away from the rotation center, of the fluid unit far away from the rotation center, and the fluid inlet of the fluid unit close to the rotation center is located at an end, close to the rotation center, of the fluid unit close to the rotation center.

The fluid transferring unit is a fluid pipeline. A fluid inlet end of the fluid pipeline is connected to the fluid outlet of the fluid unit far away from the rotation center and a fluid outlet end of the fluid pipeline is connected to the fluid inlet of the fluid unit close to the rotation center.

A suction force of the fluid unit close to the rotation center and a suction force of the fluid pipeline are greater than a suction force of the fluid unit far away from the rotation center. When the centrifugation stops, liquid in the fluid unit far away from the rotation center is transferred into the fluid unit close to the rotation center via the fluid pipeline under capillary action.

Preferably, the number of the fluid unit close to the rotation center is one.

Or the number of the fluid unit close to the rotation center is at least two, and each of the at least two fluid unit close to the rotation centers is independently arranged.

Preferably, the fluid unit close to the rotation center is a chamber or a segment of a fluid pipeline structure.

Preferably, the fluid unit close to the rotation center is the chamber, and the chamber is a thin chamber with a chamber height from 0.01 mm to 2 mm or a thick chamber with the chamber height from 2 mm to 10 mm.

Preferably, the fluid unit close to the rotation center is the segment of the fluid pipeline structure, and a cross section of the fluid pipeline structure has an equivalent diameter from 0.01 mm to 2 mm.

Preferably, a micro array structure is provided on an inner wall of the fluid unit close to the rotation center, and the micro array structure is circular, elliptic or polygonal.

Preferably, a fluid adsorbing structure in block-shaped or layer-shaped is provided in the fluid unit close to the rotation center, and the fluid absorbing structure is not configured to react with a sample to be tested.

Preferably, the number of the fluid pipeline is one.

Or, multiple fluid pipelines are provided, and each of the multiple fluid pipelines is independently arranged.

Preferably, the shape of the cross section of the fluid pipeline is rectangular, circular or elliptic, and the cross section of the fluid pipeline has the equivalent diameter from 0.01 mm to 2 mm.

Preferably, the micro array structure is provided on the inner wall of the fluid pipeline, and the micro array structure is circular, elliptic or polygonal.

Preferably, one or more valve systems for driving the fluid are arranged in a radial direction and a circumferential direction.

Preferably, a rotation center position of the valve system for driving the fluid is located outside a reactor or inside the reactor.

A method for using the valve system for driving the fluid is applied to the valve system for driving the fluid and includes:

performing affinity modification on the fluid pipeline and the fluid unit close to the rotation center by surfactant;

or, adding the surfactant to the liquid in the fluid unit far away from the rotation center in a case that the fluid pipeline and the fluid unit close to the rotation center are non-affinity phenotype.

Preferably, the surfactant is sodium dodecyl sulfate and/or polyethylene glycol octylphenol ether and/or agarose and/or polysorbate and/or polypeptide.

In the above technical solutions, the valve system for driving the fluid according to the present application is applied to the microfluidic chip and includes the fluid unit far away from the rotation center, the fluid unit close to the rotation center, the fluid transferring unit and the gas path pipeline for communicating the fluid unit close to the rotation center with the fluid unit far away from the rotation center. The rotation radius of the fluid outlet of the fluid unit far away from the rotation center is greater than the rotation radius of the fluid inlet of the fluid unit close to the rotation center. The fluid outlet of the fluid unit far away from the rotation center is located at the end of the fluid unit far away from the rotation center away from the rotation center, and the fluid inlet of the fluid unit close to the rotation center is located at the end of the fluid unit close to the rotation center close to the rotation center. The fluid transferring unit is the fluid pipeline. The fluid inlet end of the fluid pipeline is connected to the fluid outlet of the fluid unit far away from the rotation center and the fluid outlet end of the fluid pipeline is connected to the fluid inlet of the fluid unit close to the rotation center. The suction force of the fluid unit close to the rotation center and the suction force of the fluid pipeline are greater than that of the fluid unit far away from the rotation center. When the centrifugation stops, the liquid in the fluid unit far away from the rotation center is transferred into the fluid unit close to the rotation center via the fluid pipeline under capillary action. When the valve system for driving the fluid works, the liquid in the fluid unit far away from the rotation center flows into the fluid unit close to the rotation center via the fluid pipeline, and the liquid flows into a downstream unit of the fluid unit close to the rotation center under the action of centrifugal force after flowing into the fluid unit close to the rotation center.

According to the above description, in the valve system for driving the fluid according to the present application, the liquid in the fluid unit far away from the rotation center which is far from the rotation center is transferred to the fluid unit close to the rotation center which is close to the rotation center through the fluid pipeline, so as to realize liquid backflow to the rotation center. During the backflow, the suction force of the fluid unit close to the rotation center and the suction force of the fluid pipeline are greater than the suction force of the fluid unit far away from the rotation center, the fluid transfer may be realized under capillary action without any external force, and the operation is simple, thus facilitating the fluid transfer in the microfluidic chip.

BRIEF DESCRIPTION OF THE DRAWINGS

For more clearly illustrating embodiments of the present application or technical solutions in the conventional technology, the drawing referred to describe the embodiments or the conventional technology will be briefly described hereinafter. Apparently, the drawing in the following description is only an example of the present application, and for those skilled in the art, other drawings may be obtained based on the provided drawing without any creative efforts.

Figure 1:
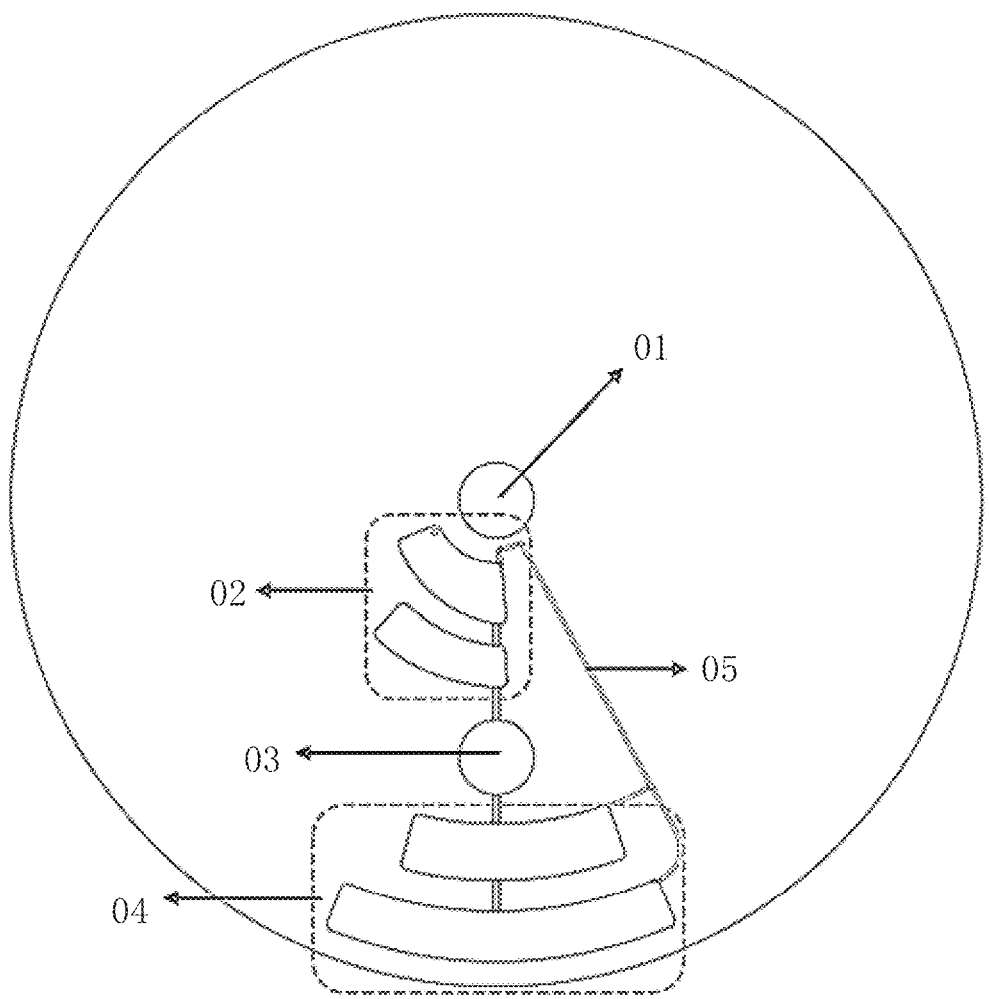
FIG. 1 is a schematic structural view of a conventional microfluidic chip.
Figure 2:
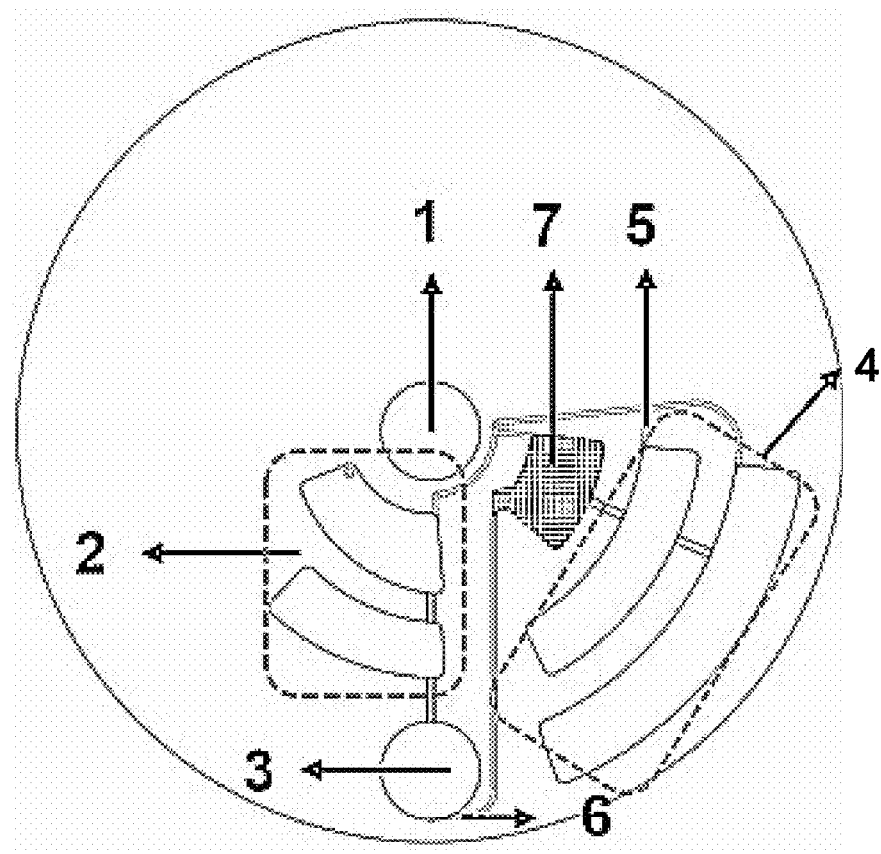
FIG. 2 is a schematic structural view of a microfluidic chip according to an embodiment of the present application.

Reference numerals in FIGS. 1 to 9.

| | |
|---|---|
| 01 central position, | 02 upstream fluid unit, |
| 03 fluid unit far away from rotation center, | 04 downstream fluid unit, |
| 05 gas path passage, | 1 rotation central position, |
| 2 upstream fluid unit, | 2a anterior cell lysis zone, |
| 2b purification zone, | 3 fluid unit far away from rotation center, |
| 4 downstream fluid unit, | 4a primary downstream fluid unit, |
| 4b secondary downstream fluid unit, | 4-1 first downstream fluid unit, |
| 4-2 second downstream fluid unit, | 5 gas path pipeline, |
| 6 fluid pipeline, | 6a primary fluid pipeline, |
| 6b secondary fluid pipeline, | 6-1 first fluid pipeline, |
| 6-2 second fluid pipeline, | 6-3 third fluid pipeline, |
| 6-4 fourth fluid pipeline, | 6-5 fifth fluid pipeline, |
| 7 fluid unit close to rotation center, | 7a primary fluid unit close to rotation center, |
| 7b secondary fluid unit close to rotation center, | 7-1 first fluid unit close to rotation center, |
| 7-2 second fluid unit close to rotation center, | 8 inlet passage far away rotation center, |
| 9 outlet passage close to rotation center, | |
| 9a primary outlet passage close to rotation center, | |
| 9b secondary outlet passage close to rotation center. | |

DETAILED DESCRIPTION OF THE EMBODIMENTS

A core of the present application is to provide a valve system for driving the fluid, so as to reduce the size of a microfluidic chip in the direction of a rotation radius. And another core of the present application is to provide a method for using the valve system for driving the fluid.

In order to enable the person skilled in the art to better understand the technical solution of the present application, the present application is further described in detail with reference to drawings and embodiments.

FIGS. 2 to 9 are referred.

In an embodiment of the present application, the valve system for driving the fluid according to a specific embodiment of the present application is applied to the microfluidic chip and includes a fluid unit far away from the rotation center 3, a fluid unit close to the rotation center 7, a fluid transferring unit and a gas path pipeline 5 for communicating the fluid unit close to the rotation center 7 with the fluid unit far away from the rotation center 3. The fluid transferring unit is configured to drive fluid in the fluid unit far away from the rotation center 3 into the fluid unit close to the rotation center 7. The fluid unit close to the rotation center 7 is located at a downstream of the fluid transferring unit, and the fluid transferring unit is a fluid pipeline 6, as shown in FIGS. 2 to 8. The rotation radius of a fluid outlet of the fluid unit far away from the rotation center 3 is greater than the rotation radius of a fluid inlet of the fluid unit close to the rotation center 7. In an embodiment, the rotation radius of the fluid outlet of the fluid unit far away from the rotation center 3 is greater than the rotation radius of the fluid outlet of the fluid unit close to the rotation center 7. Specifically, an inlet passage far away from the rotation center 8 is provided outside the fluid inlet of the fluid unit far away from the rotation center 3 to be connected with an external device for inputting the liquid. And an outlet passage close to the rotation center 9 is provided outside the fluid outlet of the fluid unit close to the rotation center 7 to output the liquid.

The fluid transferring unit is the fluid pipeline 6, and a fluid inlet end of the fluid pipeline 6 is connected to the fluid outlet of the fluid unit far away from the rotation center 3 and a fluid outlet end of the fluid pipeline 6 is connected to the fluid inlet of the fluid unit close to the rotation center 7. Generally, the fluid unit far away from the rotation center 3 is a fluid cell on the microfluidic chip at an intermediate link during multi-step liquid transfer, and the fluid cell is provided with at least one fluid inlet and at least one fluid outlet.

A suction force of the fluid unit close to the rotation center 7 and a suction force of the fluid pipeline 6 are greater than a suction force of the fluid unit far away from the rotation center 3. When the centrifugation stops, the liquid in the fluid unit far away from the rotation center 3 is transferred into the fluid unit close to the rotation center 7 via the fluid pipeline 6 under capillary action.

Specifically, the gas path pipeline 5 is arranged between the fluid unit far away from the rotation center 3 (or an upstream fluid unit 2) and the fluid unit close to the rotation center 7 (or a downstream fluid unit 4). Specifically, one or more gas path pipelines 5 may be arranged.

Specifically, the fluid unit close to the rotation center 7 is provided with a vent, and the gas path pipeline 5 is in communication with the vent. The vent is located at an end, close to the rotation center, of the fluid unit close to the rotation center 7 and away from the fluid inlet of the fluid unit close to the rotation center 7.

When the liquid is transferred along the fluid pipeline 6 from the fluid unit far away from the rotation center 3 into the fluid unit close to the rotation center 7, the gas path pipeline 5 may balance the air pressure between the two fluid cells, thereby achieving continuously transfer of the liquid.

The fluid unit close to the rotation center 7 or the downstream thereof is further provided with at least a gas communicating outlet, so as to achieve the communication of the gas path pipeline 5.

A micro array structure is provided on an inner wall of the fluid unit close to the rotation center 7, and the micro array structure is circular, elliptic, polygonal or the like, which facilitates the fluid transfer.

Specifically, the micro array structure is provided on the inner wall of the fluid pipeline 6, and the micro array structure may be circular, elliptic or polygonal. Specifically, the micro array structure may be triangular, quadrilateral or the like. Specifically, the micro array structure may be a rectangular structure when it is quadrilateral.

The fluid inlet end of the fluid pipeline 6 is connected to the fluid outlet of the fluid unit far away from the rotation center 3 and the fluid outlet end of the fluid pipeline 6 is connected to the fluid inlet of the fluid unit close to the rotation center 7.

In a specific embodiment of the present application, the rotation radius of the fluid inlet of the fluid unit close to the rotation center 7 is greater than the rotation radius of the fluid outlet of the fluid unit close to the rotation center 7, so as to discharge the liquid to the downstream from the fluid unit close to the rotation center 7 in time under the action of the centrifugal force.

Specifically, the fluid may be directly added into the fluid unit far away from the rotation center 3 manually, or the fluid at the upstream of the fluid unit far away from the rotation center 3 is transferred to the fluid unit far away from the rotation center 3 under a certain external force, especially the centrifugal force.

Specifically, one or more valve systems for driving the fluid are arranged in the radial direction and the circumferential direction. Specifically, the valve systems for driving the fluid are arranged in the radial direction of the rotational direction of the microfluidic chip.

When the valve system for driving the fluid works, first, the microfluidic chip keeps in static, the liquid in the fluid unit far away from the rotation center 3 flows into the fluid pipeline 6 under the action of surface tension and reaches the fluid unit close to the rotation center 7 through the fluid pipeline 6. The liquid flows into a downstream unit of the fluid unit close to the rotation center 7 under the action of centrifugal force after flowing into the fluid unit close to the rotation center 7.

Specifically, a rotation center position 1 of the valve system for driving the fluid may be located inside a reactor or outside the reactor.

According to the above description, in the valve system for driving the fluid according to the present application, the liquid which is far from the rotation center position 1 is transferred to the fluid unit close to the rotation center 7 which is close to the rotation center position 1 through the fluid pipeline 6, so as to realize liquid backflow to the end close to the rotation center, and make the downstream unit structure connected to the fluid unit close to the rotation center 7 be close to the rotation center, thereby reducing the size of the microfluidic chip in the direction of the rotation radius.

The suction force of the fluid unit close to the rotation center 7 and the suction force of the fluid pipeline 6 are greater than the suction force of the fluid unit far away from the rotation center 3 during the backflow. The fluid transfer may be realized under capillary action without any external power, and the operation is simple, thus facilitating the fluid transfer in the microfluidic chip.

Figure 3:
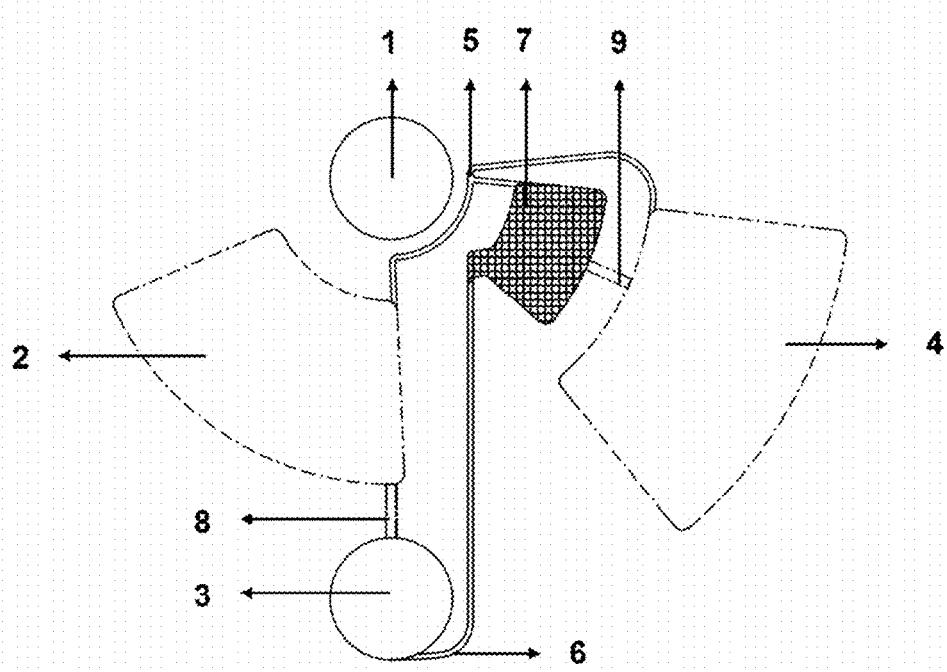
FIG. 3 is a view of a mounting position of a first valve system for driving the fluid according to an embodiment of the present application.
Figure 5:
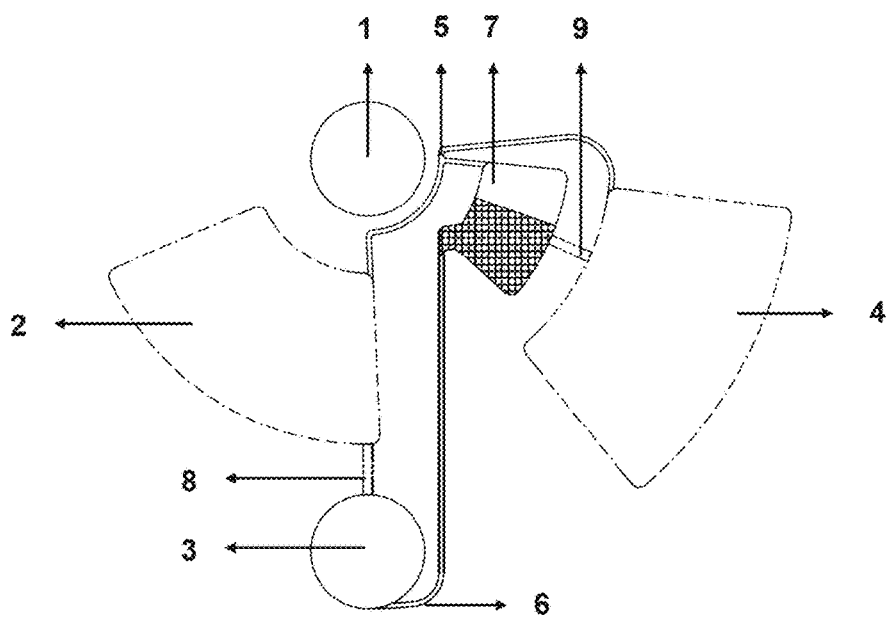
FIG. 5 is a view of the mounting position of a third valve system for driving the fluid according to an embodiment of the present application.
Figure 6:
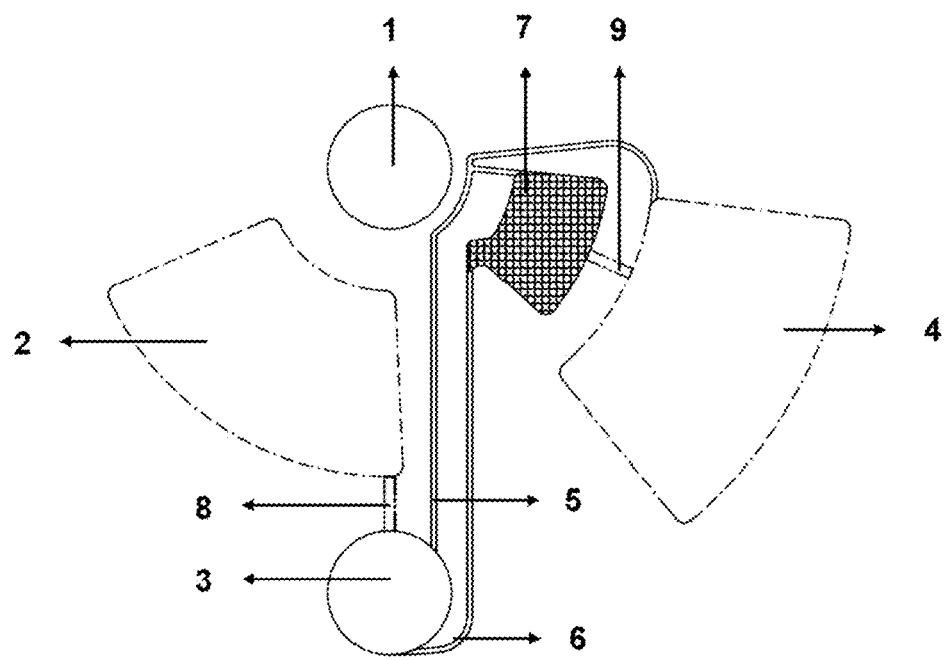
FIG. 6 is a view of the mounting position of a fourth valve system for driving the fluid according to an embodiment of the present application.
Figure 7:
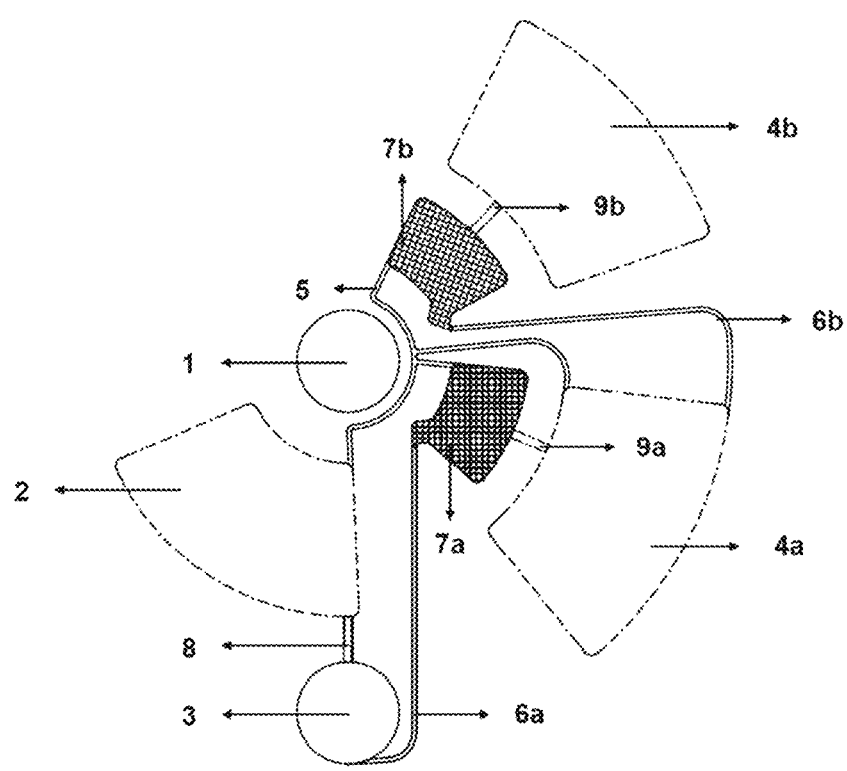
FIG. 7 is a view of the mounting position of a fifth valve system for driving the fluid according to an embodiment of the present application.

Specifically, the number of the fluid pipeline 6 may be one, such as a first valve system for driving the fluid shown in FIG. 3, a third valve system for driving the fluid shown in FIG. 5 and a fifth valve system for driving the fluid shown in FIG. 7.

Figure 4:
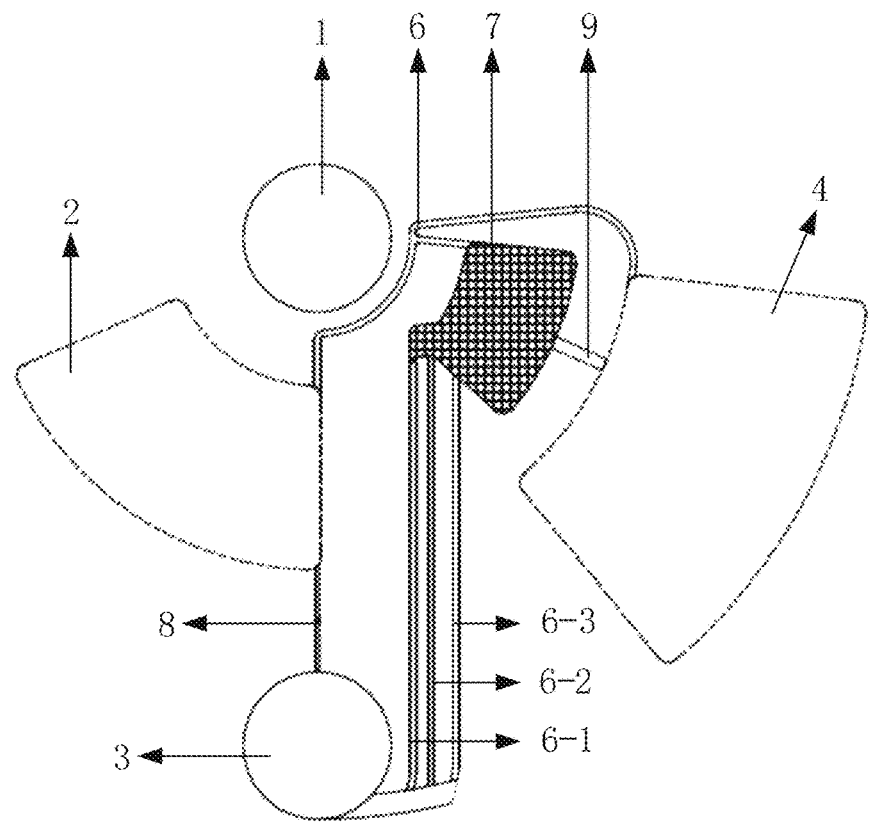
FIG. 4 is a view of the mounting position of a second valve system for driving the fluid according to an embodiment of the present application.

In order to improve the efficiency of the fluid transfer, in an embodiment, the number of the fluid pipeline 6 may be at least two, and each of the at least two fluid pipeline 6 is independently arranged. When three fluid pipelines 6 are provided, it is a second valve system for driving the fluid as shown in FIG. 4. The fluid pipeline 6 includes a first fluid pipeline 6-1, a second fluid pipeline 6-2 and a third fluid pipeline 6-3 arranged in parallel. Specifically, the shape of a cross section of the fluid pipeline 6 is circular, elliptic or polygonal. When the cross section of the fluid pipeline 6 is polygonal, it may be rectangular or trapezoidal and the like. Certainly, the cross section of the fluid pipeline 6 may be set into other shapes according to actual needs.

The cross section of the fluid pipeline 6 has an equivalent diameter from 0.01 mm to 2 mm. Specifically, the cross section of the fluid pipeline 6 has the equivalent diameter from 0.05 mm to 1 mm. The equivalent diameter of the cross section of the fluid pipeline 6 may be 0.05 mm, 0.2 mm, 0.5 mm, 0.8 mm and the like. The specific shape, size and number of the fluid pipeline 6 may be determined according to a required backflow rate of the fluid.

In a specific embodiment, the inner wall or a part of the inner wall of the fluid pipeline 6 and/or the fluid unit close to the rotation center 7 is an affinity-type surface. Specifically, the affinity-type surface may be a sodium dodecyl sulfate (SDS) layer, a polyethylene glycol octyl phenyl ether (Triton X-100) layer, an agarose layer, a tween (Tween80/Tween20) layer or a polypeptide layer. The affinity-type surface may also be a specific nano material or any component that may reduce a contact angle between the liquid and a pipe wall and is compatible with the reagent to be operated and subsequent reactions. The pipeline may be modified by pre modification such as chemical vapor deposition or coating with solution with surfactant and drying. The available surfactants include, but are not limited to Tween80, Tween20, TritonX-100, sugars, polypeptides and the like, or any component that may reduce the contact angle between the liquid and the pipe wall and is compatible with the reagent to be operated and subsequent reactions.

The inner wall or a part of the inner wall of the fluid pipeline 6 and/or the fluid unit close to the rotation center 7 performs an affinity-type surface treatment. For the liquid to pass through the inner wall, the contact angle between the liquid and a treated surface is less than the contact angle between the liquid and an untreated surface. The treated surface is more conducive for the liquid to flow in the fluid pipeline 6 driven by the surface tension, so as to be more conducive for the liquid to flow into the fluid pipeline 6 and reach the fluid unit close to the rotation center 7 under the action of the surface tension.

In a specific embodiment, the fluid inlets of the fluid unit close to the rotation center 7 respectively correspond to the fluid pipelines 6. Specifically, in an embodiment, the fluid inlet of the fluid unit close to the rotation center 7 is arranged at an end of the fluid unit close to the rotation center 7 close to the rotation central position 1, and the fluid outlet of the fluid unit close to the rotation center 7 is arranged at an end of the fluid unit close to the rotation center 7 away from the rotation central position 1.

Figure 8:
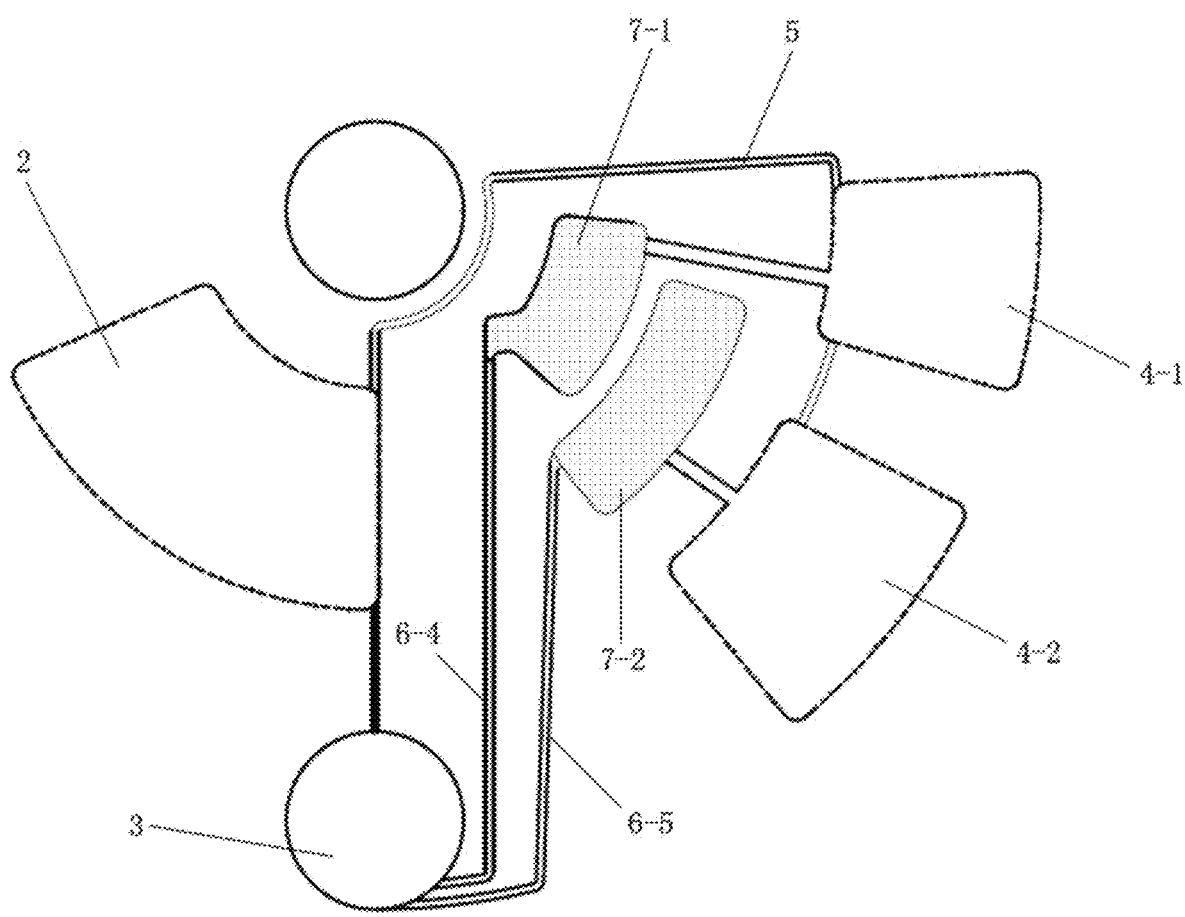
FIG. 8 is a view of the mounting position of a sixth valve system for driving the fluid according to an embodiment of the present application.

Specifically, at least two fluid unit close to the rotation centers 7 are provided, and each of the at least two fluid unit close to the rotation center 7 is independently arranged. The number of the fluid unit close to the rotation centers 7 is equal to the number of the fluid pipelines 6, and the fluid unit close to the rotation centers 7 respectively corresponds to the fluid pipelines 6. As shown in FIG. 8, a fourth fluid pipeline 6-4 is connected to a first fluid unit close to the rotation center 7-1, a fifth fluid pipeline 6-5 is connected to a second fluid unit close to the rotation center 7-2, the downstream of the first fluid unit close to the rotation center 7-1 is connected to a first downstream fluid unit 4-1, and the downstream of the second fluid unit close to the rotation center 7-2 is connected to a second downstream fluid unit 4-2.

A volume of a chamber of the fluid unit close to the rotation center 7 is directly proportional to the volume of the fluid to be transferred. Therefore, the liquid may be quantitatively transferred by controlling the volume of the chamber of the fluid unit close to the rotation center 7.

Specifically, the fluid unit close to the rotation center 7 is a chamber or a segment of a fluid pipeline structure. Specifically, the fluid unit close to the rotation center 7 is a thin chamber with a chamber height from 0.01 mm to 2 mm, and in an embodiment, the chamber height is from 0.05 mm to 1 mm, so that the fluid unit close to the rotation center 7 maintains a certain capillary force.

In another specific embodiment, the fluid unit close to the rotation center 7 is a fluid cell with a preset depth, and the fluid unit close to the rotation center 7 is a thick chamber with the chamber height from 2 mm to 10 mm Specifically, the fluid unit close to the rotation center 7 is the fluid cell with the depth of 3 mm, 4 mm or 5 mm and the like.

A fluid adsorbing structure is provided in the fluid unit close to the rotation center 7, and the fluid absorbing structure does not react with a sample to be tested. That is, the material itself of the fluid adsorbing structure should have good chemical inertness for the adsorbed liquid, and the composition of the liquid is not easy to be changed after adsorption. Specifically, a certain mass of fluid adsorbing structure is accommodated in the fluid unit close to the rotation center 7.

In order to improve the efficiency of the liquid transfer, in an embodiment, the fluid adsorbing structure directly contacts with or is close to the fluid inlet of the fluid unit close to the rotation center 7.

Specifically, the fluid adsorbing structure in block-shaped or layer-shaped is arranged in the fluid unit close to the rotation center 7. When the fluid adsorbing structure is in block-shaped, in an embodiment, multiple fluid adsorbing structures are provided.

When the fluid adsorbing structure is in layer-shaped, the fluid adsorbing structure may be porous absorbent paper, gauze, silicon dioxide fiber, sponge, collodion or the like. Preferably, the fluid adsorbing structure is multilayer overlapped. Since the porous materials such as absorbent paper, gauze, silicon dioxide fiber, sponge, collodion and the like are arranged, and the adsorbing materials generally may be selected with a good adsorbing capacity to the liquid, thereby improving the efficiency of the liquid transfer.

When the fluid flows into the fluid unit close to the rotation center 7, due to the absorption effect of the fluid absorbing structure, the liquid in the fluid unit far away from the rotation center 3 will continuously flow into the fluid absorbing structure in the fluid unit close to the rotation center 7 through the fluid pipeline 6 at a certain rate, until the liquid in the fluid unit far away from the rotation center 3 is completely absorbed by the adsorbing material or the adsorbing material reaches saturation.

When the liquid transfer from an end far away from the rotation center to an end close to the rotation center is completed, under the action of the centrifugal force, the adsorbed liquid in the fluid unit close to the rotation center 7 is released from the adsorbing material and flows into the downstream fluid unit 4 through the fluid outlet.

In a specific embodiment, the volume of the fluid adsorbing structure in the fluid unit close to the rotation center 7 is directly proportional to the volume of the fluid to be adsorbed. Therefore, the liquid may be quantitatively transferred by controlling the volume of the adsorbing material.

Specifically, as shown in FIGS. 3, 4, 6 and 7, the fluid unit close to the rotation center 7 may be full of the fluid adsorption structure. As required, as shown in FIG. 5, the fluid adsorbing structure may also be quantitatively filled into the fluid unit close to the rotation center 7 according to the volume of the liquid to be adsorbed.

According to the present application, the fluid transfer is realized by combining the simple surface tension with the water absorbing material, and the fluid is quantitatively transferred by controlling the volume of the fluid adsorbing structure, the transfer rate of the fluid is realized by controlling the size and number of the fluid pipeline 6, and the method may completely transfer the fluid.

The present application has advantages as follows: 1, the structure is simple and facilitates processing and manufacturing. 2, additional driving force or special conditions don't need. 3, it is easy to be integrated and has good universality.

When the valve system for driving the fluid is applied to the microfluidic chip, the valve system for driving the fluid is connected between the upstream fluid unit 2 and the downstream fluid unit 4. The fluid outlet of the fluid unit close to the rotation center 7 is connected to the fluid inlet of the downstream fluid unit 4 through the pipeline, and the upstream fluid unit 2 is located at the upstream of the fluid unit far away from the rotation center 3.

Specifically, the gas path pipeline 5 is in communication with the fluid unit far away from the rotation center 3 through the upstream fluid unit 2, and the gas path pipeline 5 is in communication with the downstream fluid unit 4.

In a specific embodiment, as shown in FIG. 7, the downstream fluid units 4 are multiple, and the two adjacent downstream fluid units are connected with each other through the valve system for driving the fluid. The downstream fluid unit 4 includes a primary downstream fluid unit 4a and a secondary downstream fluid unit 4b. At this time, the primary downstream fluid unit 4a serves as the fluid unit far away from the rotation center of the valve system for driving the fluid between the two downstream fluid units.

Figure 9:
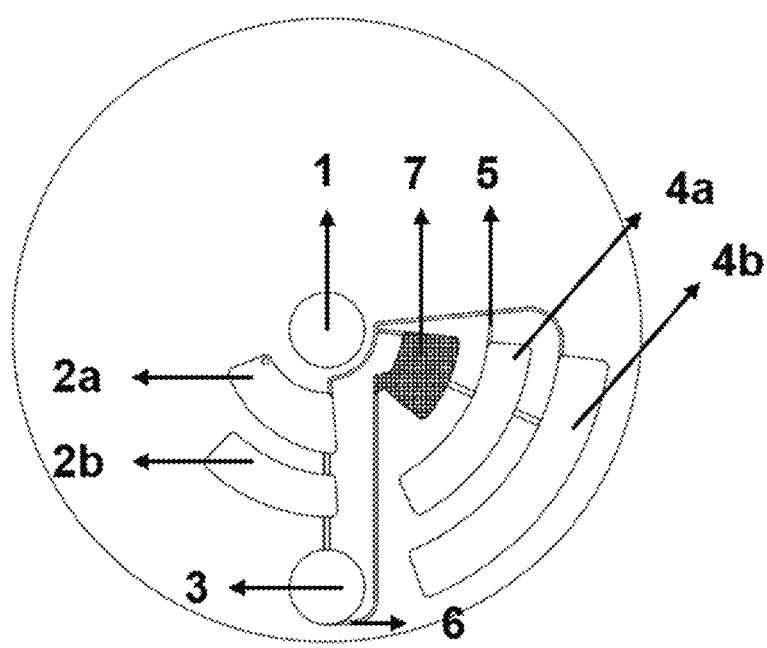
FIG. 9 is a specifically structural view of the microfluidic chip according to an embodiment of the present application.

The working process of the valve system for driving the fluid is introduced according to FIG. 9 hereinafter. At this time, the fluid unit far away from the rotation center 3 serves as a mixing and pre amplification cell, and the fluid unit close to the rotation center 7 serves as a nucleic acid reservoir, and the downstream fluid unit 4 is a nucleic acid quantitative and amplification testing unit. The specific description of the working process of the valve system for driving the fluid on the microfluidic chip is as follows:

1. An anterior cell lysis zone 2a serves as a cell lysis zone. A sample to be tested is supplied into the lysis cell, and nucleic acid molecules are obtained by a certain lysis.

2. A purification zone 2b serves as a nucleic acid purification zone. The mixed nucleic acid obtained from the cell lysis zone passes through the purification zone 2b to obtain high purity nucleic acid.

3. The obtained high purity nucleic acid is transferred to the mixing and pre amplification cell by a certain centrifugal force.

4. The nucleic acid is transferred through the fluid pipeline 6. The fluid pipeline 6 has the length from 20 mm to 40 mm, and the width multiplied by the depth of the pipeline is about 0.1 mm to 1 mm multiplied by 0.1 mm to 1 mm. The number of the fluid pipelines 6 may be set to 1 to 5, which may be adjusted and determined according to the backflow rate of the fluid. The backflow time may be controlled within 10 s to 90 s, and the micro pipeline surface modification is performed, which may use the chemical modification, such as surfactant Tween80, Tween20, Triton X-100 and the like.

5. A certain water absorbing material is placed in the nucleic acid reservoir. A silicon membrane which has strong water absorbing quality and good dehydration property may be used, and the high purity nucleic acid is transferred to the nucleic acid reservoir through the fluid pipeline 6.

6. Under a certain centrifugal force condition, the liquid in the nucleic acid reservoir flows into the nucleic acid quantitative and amplification testing unit. The nucleic acid quantitative and amplification testing unit includes a nucleic acid quantitative cell served as a primary downstream fluid unit 4a and an amplification testing zone served as a secondary downstream fluid unit 4b.

A method for using the valve system for driving the fluid is provided according to the present application, which is applied to the microfluidic chip. And the method includes:
affinity modification is performed on the fluid pipeline 6 and the fluid unit close to the rotation center 7 by surfactant;
or, the surfactant is added to the liquid in the fluid unit far away from the rotation center 3 in a case that the fluid pipeline 6 and the fluid unit close to the rotation center 7 are non-affinity phenotype.

The surfactant includes, but is not limited to sodium dodecyl sulfate, polyethylene glycol octylphenol ether, agarose, polysorbate or polypeptide. Specifically, the surfactant may be a mixture of two of the above.

The specific structure of the microfluidic chip has been described before. The present application includes the microfluidic chip, which also has the above technical effect. By providing the surfactant, the fluid is transferred quickly, and the working efficiency of the valve system for driving the fluid is effectively improved.

The above embodiments are described in a progressive manner. Each of the embodiments is mainly focused on describing its differences from other embodiments, and references may be made among these embodiments with respect to the same or similar parts.

The above description of the embodiments herein enables those skilled in the art to implement or use the present application. Various modifications to the embodiments are apparent to the person skilled in the art, and the general principle herein can be implemented in other embodiments without departing from the spirit or scope of the present application. Therefore, the present application will not be limited to the embodiments described herein, but should be in accordance with the broadest scope consistent with the principle and novel features disclosed herein.

The invention claimed is:
1. A valve system for driving fluid, applied to a microfluidic chip, comprising:

a first fluid unit far away from a rotation center;
a second fluid unit close to the rotation center;
a fluid transferring unit; and
a gas path pipeline for communicating the second fluid unit close to the rotation center with the first fluid unit far away from the rotation center; and
wherein;
a rotation radius of a fluid outlet of the first fluid unit far away from the rotation center is greater than a rotation radius of a fluid inlet of the second fluid unit close to the rotation center, the fluid outlet of the first fluid unit far away from the rotation center is located at an end, away from the rotation center, of the first fluid unit far away from the rotation center, and the fluid inlet of the second fluid unit close to the rotation center is located at an end, close to the rotation center, of the second fluid unit close to the rotation center;
the fluid transferring unit is a fluid pipeline, a fluid inlet end of the fluid pipeline is connected to the fluid outlet of the first fluid unit far away from the rotation center and a fluid outlet end of the fluid pipeline is connected to the fluid inlet of the second fluid unit close to the rotation center; and
a suction force of the second fluid unit close to the rotation center and a suction force of the fluid pipeline during backflow are greater than a suction force of the first fluid unit far away from the rotation center, and liquid in the first fluid unit far away from the rotation center is configured to be transferred into the second fluid unit close to the rotation center via the fluid pipeline under capillary action when centrifugation stops.

2. The valve system for driving the fluid according to claim 1, wherein:
a number of the second fluid unit close to the rotation center is one; or
the number of the second fluid unit close to the rotation center is at least two, and each of the at least two second fluid unit close to the rotation centers is independently arranged.

3. The valve system for driving the fluid according to claim 1, wherein the second fluid unit close to the rotation center is a chamber or a segment of a fluid pipeline structure.

4. The valve system for driving the fluid according to claim 3, wherein the second fluid unit close to the rotation center is the chamber, and the chamber is a thin chamber with a chamber height from 0.01 mm to 2 mm or a thick chamber with the chamber height from 2 mm to 10 mm.

5. The valve system for driving the fluid according to claim 3, wherein the second fluid unit close to the rotation center is the segment of the fluid pipeline structure, and a cross section of the fluid pipeline structure has an equivalent diameter from 0.01 mm and 2 mm.

6. The valve system for driving the fluid according to claim 1, wherein, a micro array structure is provided on an inner wall of the second fluid unit close to the rotation center or an inner wall of the fluid pipeline; and the micro array structure is circular, elliptic or polygonal.

7. The valve system for driving the fluid according to claim 1, wherein, a fluid adsorbing structure in block-shaped or layer-shaped is provided in the second fluid unit close to the rotation center, and the fluid absorbing structure is not configured to react with a sample to be tested.

8. The valve system for driving the fluid according to claim 1, wherein:
the number of the fluid pipeline is one; or
a plurality of fluid pipelines are provided, and each of the plurality of fluid pipelines is independently arranged.

9. The valve system for driving the fluid according to claim 1, wherein, the shape of a cross section of the fluid pipeline is rectangular, circular or elliptic, and the cross section of the fluid pipeline has the equivalent diameter from 0.01 mm to 2 mm.

10. The valve system for driving the fluid according to claim 1, wherein one or more valve systems for driving the fluid are arranged in a radial direction of a microfluidic chip and a circumferential direction of the microfluidic chip.

11. The valve system for driving the fluid according to claim 1, wherein a rotation central position of the valve system for driving the fluid is located outside a reactor or inside the reactor.

12. A method for using the valve system for driving fluid, applied to the valve system for driving the fluid according to claim 1, comprising:
performing affinity modification on a fluid pipeline and a second fluid unit close to the rotation center by surfactant; or
adding the surfactant to liquid in a first fluid unit far away from the rotation center in a case that the fluid pipeline and the second fluid unit close to the rotation center are non-affinity phenotype.

13. The method for using the valve system for driving the fluid according to claim 12, wherein: the surfactant is sodium dodecyl sulfate and/or polyethylene glycol octylphenol ether and/or agarose and/or polysorbate and/or polypeptide.

14. A method for using the valve system for driving fluid, applied to the valve system for driving the fluid according to claim 2, comprising:
performing affinity modification on a fluid pipeline and a second fluid unit close to the rotation center by surfactant; or
adding the surfactant to liquid in a first fluid unit far away from the rotation center in a case that the fluid pipeline and the second fluid unit close to the rotation center are non-affinity phenotype.

15. The method for using the valve system for driving the fluid according to claim 14, wherein: the surfactant is sodium dodecyl sulfate and/or polyethylene glycol octylphenol ether and/or agarose and/or polysorbate and/or polypeptide.

16. A method for using the valve system for driving fluid, applied to the valve system for driving the fluid according to claim 1, comprising:
performing affinity modification on a fluid pipeline and a second fluid unit close to the rotation center by surfactant; or
adding the surfactant to liquid in a first fluid unit far away from the rotation center in a case that the fluid pipeline and the second fluid unit close to the rotation center are non-affinity phenotype.

17. The method for using the valve system for driving the fluid according to claim 15, wherein: the surfactant is sodium dodecyl sulfate and/or polyethylene glycol octylphenol ether and/or agarose and/or polysorbate and/or polypeptide.

* * * * *